United States Patent [19]
Kline

[11] Patent Number: 5,530,699
[45] Date of Patent: Jun. 25, 1996

[54] METHOD FOR DISTRIBUTED VOICE CONFERENCING IN A FAST PACKET NETWORK

[75] Inventor: Richard B. Kline, E. Walpole, Mass.

[73] Assignee: Motorola, Inc., Shaumburg, Ill.

[21] Appl. No.: 245,188

[22] Filed: May 17, 1994

[51] Int. Cl.[6] .............................. H04B 3/20; H04M 3/42
[52] U.S. Cl. ................ 370/62; 370/94.100; 370/32.100; 374/202
[58] Field of Search ............................. 370/62, 60, 94.1, 370/32.1, 110.1, 100.1, 94.2, 94.3, 60.1, 61, 108, 118; 374/202, 410, 411, 408, 406, 388, 402, 3; 375/12, 14, 103, 230, 233, 232, 350, 241; 364/724.19; 333/18, 28 R; 381/63, 14, 71; 340/825.02, 825.03

[56] References Cited

U.S. PATENT DOCUMENTS

| | | |
|---|---|---|
| 4,271,502 | 6/1981 | Goutmann et al. ...................... 370/62 |
| 5,150,410 | 9/1992 | Bertrand ..................................... 370/62 |
| 5,157,491 | 10/1992 | Kassatly ..................................... 370/62 |
| 5,341,374 | 8/1994 | Lewen et al. ........................... 370/32.1 |

Primary Examiner—Douglas W. Olms
Assistant Examiner—Dang Ton
Attorney, Agent, or Firm—J. Ray Wood

[57] ABSTRACT

A method for distributed voice conferencing in a fast packet network packetizes the speech into speech fast packets. The speech fast packets are transmitted to a central conference handler. The conference handler then provides the speech fast packets to the appropriate users. Another method of voice conferencing in a fast packet network is to send the speech fast packets directly to every other user in the voice conference.

8 Claims, 2 Drawing Sheets

METHOD FOR DISTRIBUTED VOICE CONFERENCING IN A FAST PACKET NETWORK

Fast packet networks, such as ATM (asynchronous transfer mode) systems and B-ISDN (Broadband Integrated Services Digital Network) systems, integrate voice and data communication into a single network.

Fast packet networks sample, digitize and compress voice communication, placing the digital information into "fast packets" or "cells". (A discussion of this process and such an apparatus may be found in "Perspectives on Packetized Voice and Data Communications, Ed. William P. Lidinski IEEE 1991) A fast packet is a discrete segment of digital information. Typically, one speaker generates 25 to 200 fast packets per second. Thus, in a ten minute conversation, a speaker may generate thousands of fast packets.

Each fast packet contains, among other things, the logical channel number to reach the destination node and the digital representation of a portion of the speech. Upon receipt of the packets, the destination node depacketizes the data, optionally decompresses the digitized speech and then converts the digitized speech into a speech waveform. The destination node plays the sound for the user at the destination node.

A fast packet network should be transparent to the users. Users of a fast packet network should be able to perform all tasks currently available with a dedicated telephone system. One useful task performed by analog telephone systems is voice conferencing.

In voice conferencing, more than two individuals participate in a joint telephone discussion. Voice conferencing is a valuable tool for conducting meetings with participants at various locations throughout the world. In telephone networks other than fast packet networks, the sounds from each conference participant is sent to a central conferencing hub. At the hub, the sounds are added, and then sent to the conference participants.

In order for a fast packet network to perform like a dedicated telephone system, voice conferencing between users of the fast packet network is very desirable.

DETAILED DESCRIPTION

Figure 1:
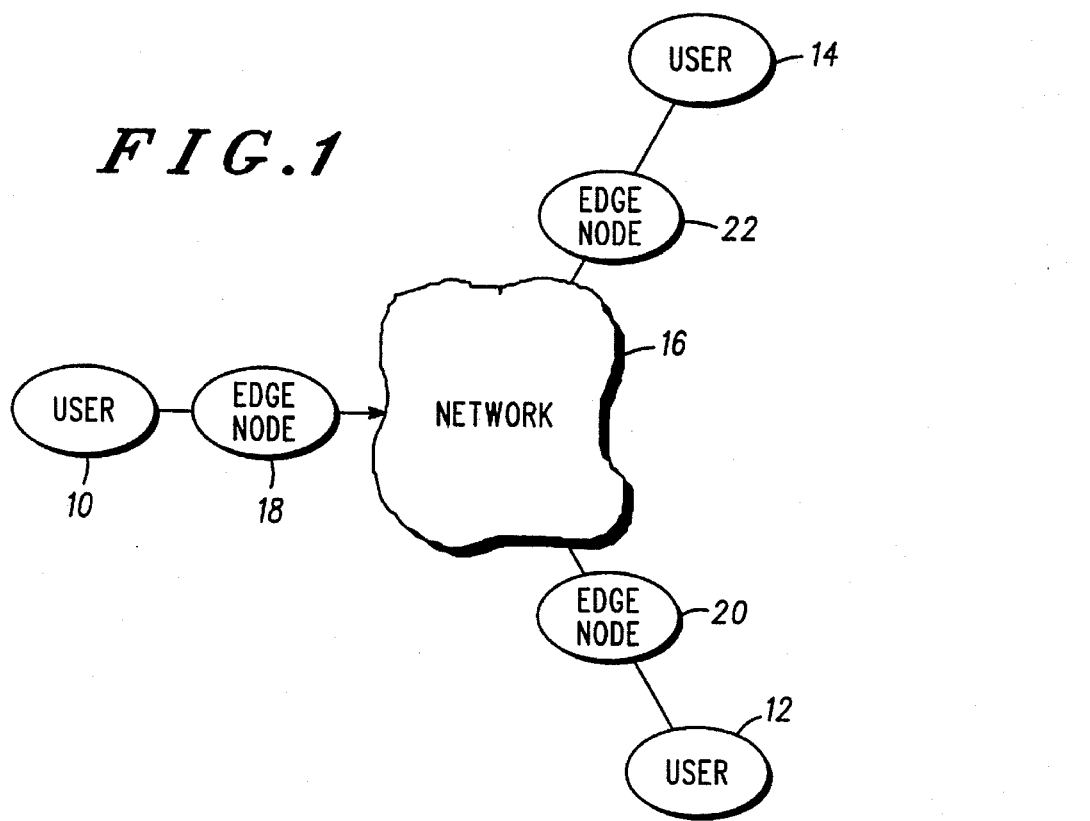
FIG. 1 is a fast packet network.

FIG. 1 shows a fast packet network. Users 10, 12, 14 interact with fast packet network 16 through edge nodes 18, 20, 22. ["Users", as defined herein, refers generally to a person communicating through a telephone and a device, such as a PBX (private branch exchange)]. (Obviously, there could be many more than three users of a fast packet network.)

Users 10, 12, 14 input digital information into the network. Edge nodes 18, 20, 22 packetize the information.

Packetizing the information consists of segmenting data from users 10, 12, 14 into small units (i.e., packets) and appending additional information (the fast packet header) that allows network 16 to route that packet from one user to another accurately and reliably. Edge nodes 18, 20, 22 transmit the packet into network 16. Network 16 transports the packets to the appropriate edge node. Upon receipt of fast packets, edge node 18, 20, 22 then depacketize the information and reconstruct the packets into digital data for use by the end user. Packetization, broadcasting, and depacketization creates delay before receipt of the packets by the end user.

During voice conferencing between users 10, 12, 14, each user 10, 12, 14 generates digital information generally in response to the digital information received from the other users. (While voice conferencing is specifically referred to herein, the methods and devices described herein could refer to any conferencing, including video conferencing.)

Figure 2:
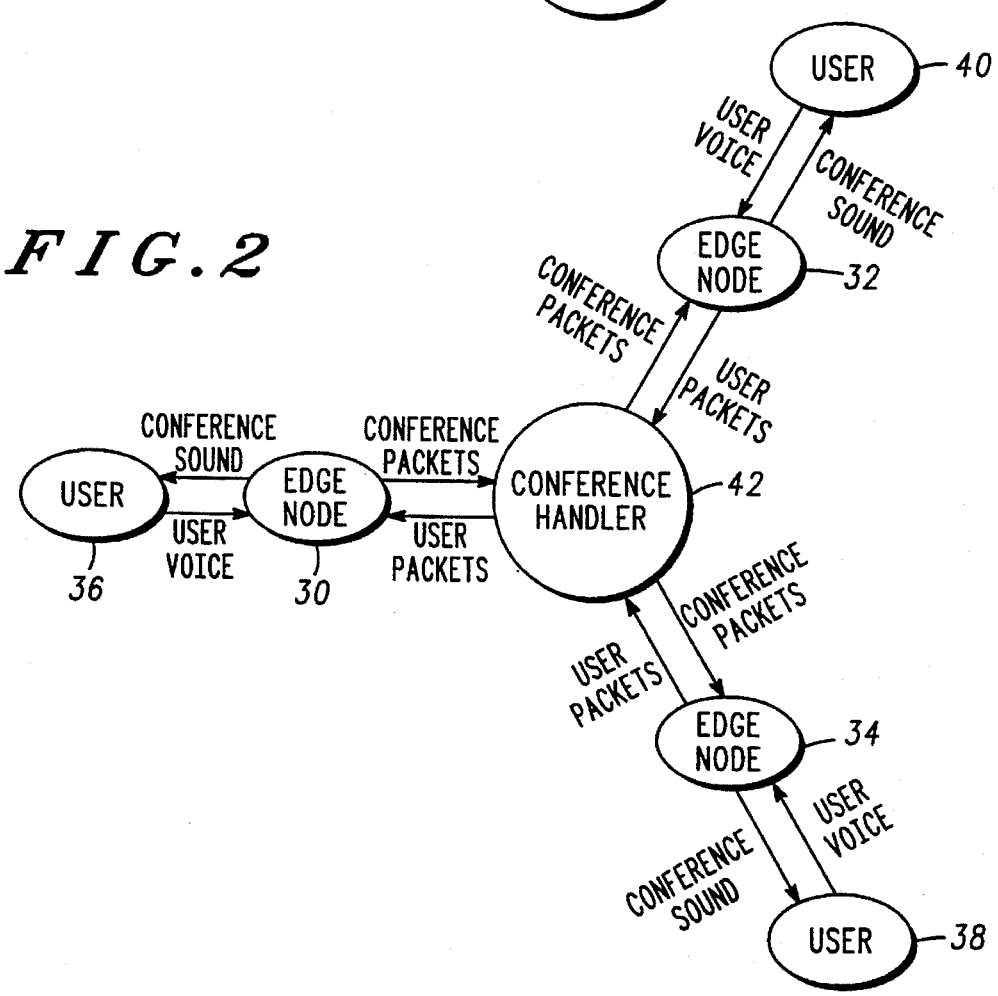
FIG. 2 is a drawing of the path of fast packets in a fast packet network.

FIG. 2 shows one method for performing voice conferencing in a fast packet network. Edge nodes 30, 3 2, 34 continuously sample, compress (encode) and packetize the sound from each user 36, 38, 40, respectively into speech fast packets. Edge nodes 30, 32, 34 send the packets to central conference handler 42. Conference handler 42 decodes the packets and creates a conference speech fast packet for each user 36, 38, 40 that includes the sound from the other users, being careful not to include the sound generated by the user receiving that particular packet. The packet is recompressed. This could be accomplished either by creating one packet as a sum from all three users and then echo cancelling the sound from the user to receive the packet or by using separate summers for each user.

Thus, the conference handler 42 creates a conference speech fast packet for user 36 that contains the sound from users 38 and 40. Three different packets are created during each time segment. The conference packet for each user 36, 38, 40 is then sent through the respective edge nodes 30, 32, 34.

Edge nodes 30, 32, 34 disassemble the conference packets, decompress the sound, and play the sound to users 36, 38, 40.

Figure 3:
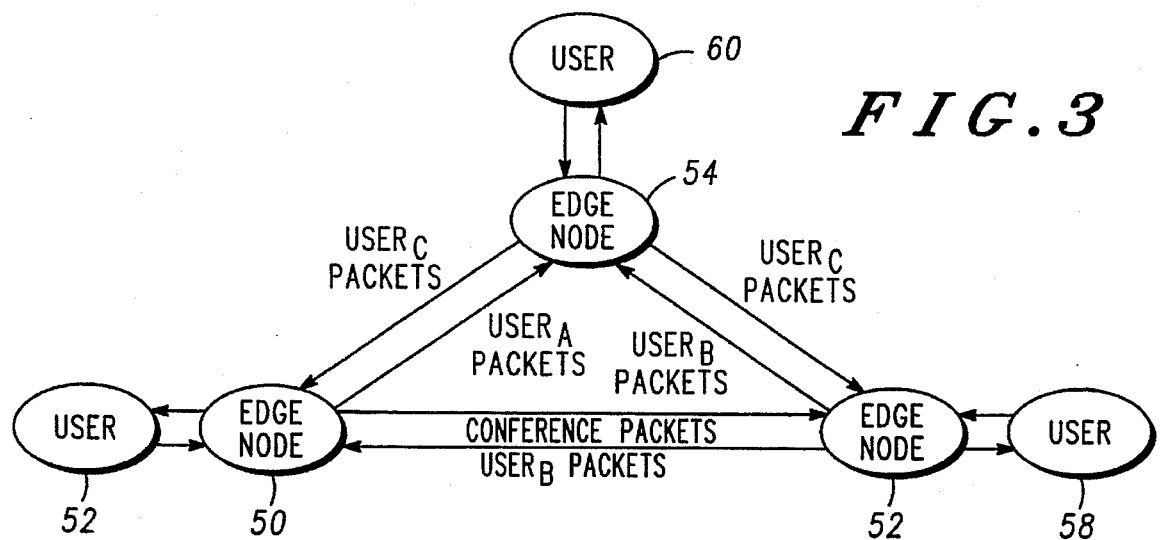
FIG. 3 is a drawing of the concurrent steps in the construction of joint conferencing in a fast packet network.

FIG. 3 shows a second method of performing voice conferencing in a fast packet network. Edge nodes 50, 52, 54 generate voice packets only when users 56, 58, 60 speak. When the edge node creates a fast packet, it sends the fast packets directly to the other conference participants. Thus, user-B 58 receives packets only when either user-A 56 or user-C 60 speaks. Otherwise, user-B 58 receives no packets.

Figure 4:
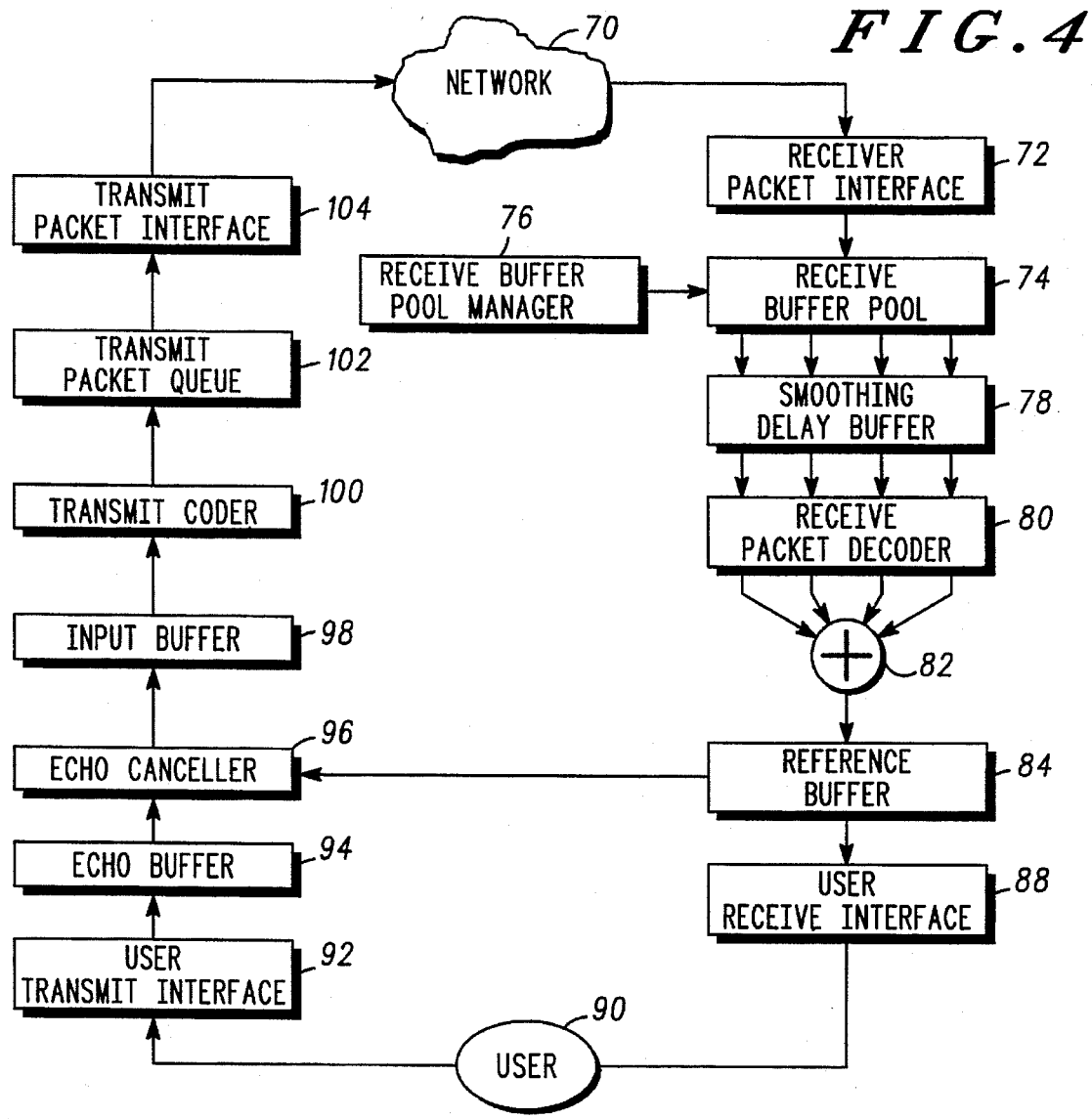
FIG. 4 is a flowchart for the voice conferencing.

FIG. 4 shows an implementation of the process shown in FIG. 3 at an edge node. The process has an "edge node transmission method" and an "edge node receiving method". The edge node transmission method is described as follows. Network 70 sends packets from the other nodes in the conference to receiver packet interface 72.

The packets are placed in received buffer pool 74. Received buffer pool manager 76 controls the receipt of the packets, the storage of the packets, and the playout of the packets based upon information contained in the fast packer header (such as the logical channel number) 70.

Smoothing delay buffer 78 receives the packets from the received buffer pool 74. Packets generated at edge node travel a path through the network from the originating edge node to the destination edge. The path is a series of intermediate nodes. Further, the queuing delay along the path from originating node to destination node may change from one packet to the next. This is known as "queuing delay jitter". In order for the fast packet network to be transparent to the user, the destination node must adjust the playout of the received packets to compensate for the packet arrival time jitter. A "smoothing delay" is used. Pending patent application "Method for Adaptive Smoothing Delay for Packet Voice Applications", U.S. application Ser. No. 08/123,822, assigned to the assignee of this application, contains a description of one method for smoothing the playout of the fast packets.

The packets from smoothing delay buffer 78 are sent to received packet decoder 80. Received packet decoder 82 reconstructs the voice from each node.

At each edge node, each conference user, other than the conference user at that edge node, has a separate smoothing buffer 78 and received packet decoder 80. Thus, for three conference participants, each edge node must have two smoothing delay buffers 78 and two received packet decoders 80. Generalizing, an n-person conference call requires n-1 smoothing delay buffers 78 and n-1 received packet decoders 80 at each edge node. Where n is large, the number of smoothing delay buffers could be limited to three or four since it is unlikely (except in conferences involving attorneys) that more than three or four people would talk simultaneously, no matter how many people participate in the conference.

Received packet decoders 80 sends the decoded data to summer 82 that digitally sums the data from each received packet decoder 80.

Reference buffer 84 receives the data, and forwards the data to the user receive interface 88. User interface 88 converts and sends speech signal to user 90.

The edge node transmission method is as follows. When user 90 speaks, user transmit interface 92 converts the speech signal into digital information. Echo buffer 94 stores the digital information.

Echo buffer 94 sends the digital information to echo canceller 96. Echo canceller 96 also receives the summed conference data from reference buffer 84. Echo canceller 96 uses the summed conference data from reference buffer 84 to cancel the echo from the receiver analog interface 92. One method of echo cancelling is described in D.G. Messerschmitt, "Echo Cancellation in Speech and Data Transmission," IEEE Journal on Selected Topics in Communications, SAC-2, No. 2, 283–303 (March, 1984).

Thus, the only digital data sent to input buffer 98 is the digital representation of sound generated by user 90.

This system requires a maximum of one echo canceller per user at each edge node. Because an echo canceller is required for each user at the edge node even for non-conference calls, no additional echo cancellers need be used to implement conference calls.

Transmitting coder 100 compresses the digital information from input buffer 98, packetizes the digital information, and places the packet into transmit packet queue 102. Transmit packet interface 104 takes packets from the transmit packet queue 102, replicates the packets, adds fast packet headers identifying each other user and sends the packets into network 70.

If the network (such as an Asynchronous Transfer Mode (ATM) network implementing ATM forum user network interface specification 3.0) is capable of establishing point-to-multipoint connections, then the transmit packet interface would not need to replicate the packets since the network itself would replicate the packets. A point-to-multipoint system is capable of establishing connections to multiple points from one point by way of a single call.

This method of voice conferencing provides many advantages. Packets are sent only to the conference users that did not generate the packets. Therefore, the described method reduces the number of fast packets. Further, a conferencing center is not needed. Each edge node, when properly equipped, can perform conferencing. There is only a single encoding of voice data, reducing the mount of voice degradation. No additional echo cancellers need be supplied either at the edge nodes or by the network. There is less delay because the packets are not first sent to a conference center prior to the packets being sent to the users.

I claim:

1. A method of conferencing speech from a plurality of voice conference edge nodes in a fast packet network comprising:

packetizing, at the edge node transmitting speech, the speech into fast;

replicating, at the edge node transmitting speech, the fast packets for every other edge node;

sending, at the edge node transmitting speech, the fast packets to every voice conference edge node except the voice conference edge node generating the speech;

receiving, at the edge node receiving speech, the fast packets from all other voice conference edge nodes;

smoothing, at the edge node receiving speech, the delay for packets received from each other voice conference edge node;

depacketizing, at the edge node receiving speech, the fast packets into speech from all other voice conference edge nodes; and summing, at the edge node receiving speech, the speech from all other voice conference edge nodes.

2. The method of claim 1, including the step in the edge node transmission method of detecting when speech occurs at the edge node, and if speech occurs at the edge node, continuing with the edge node transmission method.

3. The method of claim 1 including, in the edge node transmission method, the step of echo canceling the speech.

4. The method of claim 1, where the step of packetizing the speech, in the edge node transmission method, includes the step of compressing the speech and where the step of depacketizing the speech, in the edge node receiving method, includes the step of decompressing the speech.

5. A method of conferencing speech from a plurality of edge nodes in a fast packet network, where the fast packet network is capable of point-to-multipoint connections:

packetizing, at the edge node transmitting speech, the speech into fast packets;

transmitting, at the edge node transmitting speech, the fast packets into the network so that fast packets are received by every voice conference edge node except the voice conference edge node generating the speech;

receiving, at the edge node receiving speech, the fast packets from all other voice conference edge nodes;

applying, at the edge node receiving speech, a smoothing delay for packets received from each other voice conference edge node;

depacketizing, at the edge node receiving speech, the speech from all other voice conference edge nodes; and summing, at the edge node receiving speech, the speech from all other voice conference edge nodes.

6. The method of claim 5, including the step in the edge node transmission method of detecting when speech occurs at the edge node, and if speech occurs at the edge node, continuing with the edge node transmission method.

7. The method of claim 5 including, in the edge node transmission method, the additional step of echo canceling the speech.

8. The method of claim 5 including, the steps in the edge node transmission method of compressing the speech and including the steps in the edge node receiving method of, for packets received from each other edge node, decompressing the speech.

\* \* \* \* \*